April 14, 1931.  L. A. JOHNSON  1,800,942
PROCESS OF MAKING LAMINATED SHIMS
Filed May 27, 1929
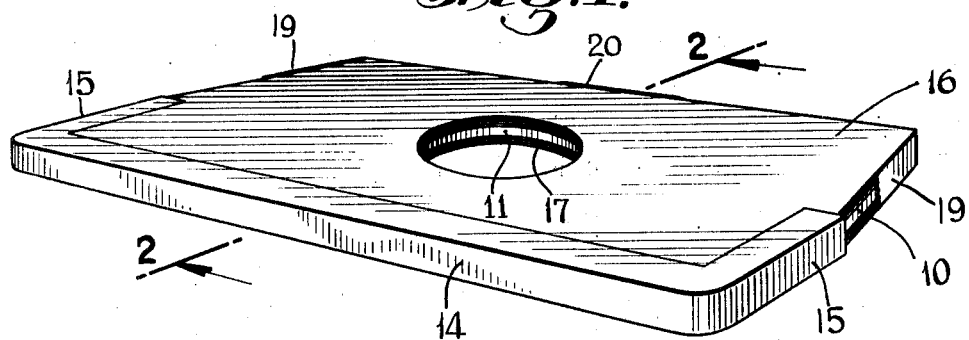
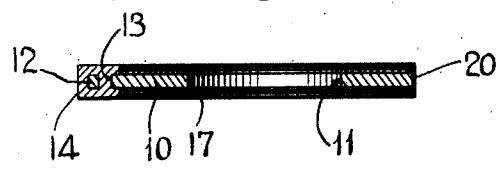
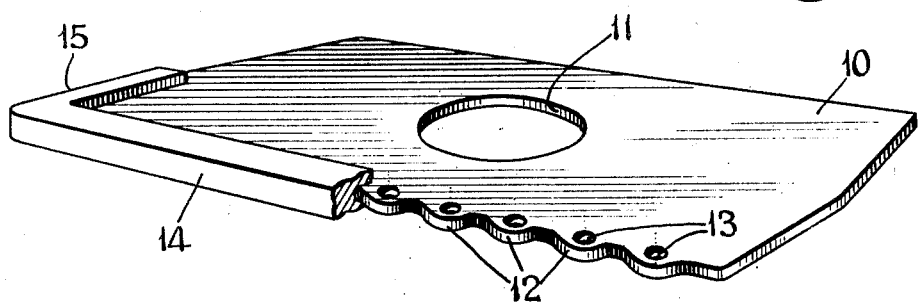
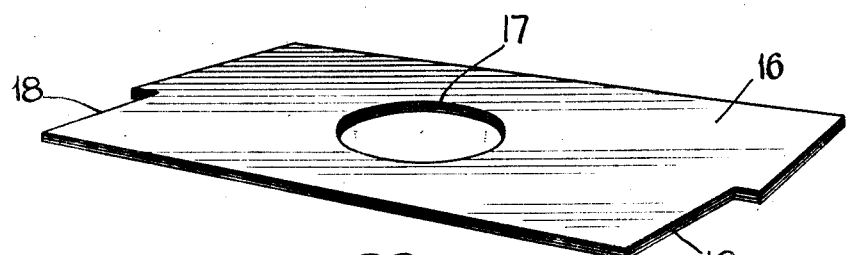
INVENTOR.
LLOYD A. JOHNSON
BY
ATTORNEY Patented Apr. 14, 1931

1,800,942

UNITED STATES PATENT OFFICE

LLOYD A. JOHNSON, OF HILLSBOROUGH, CALIFORNIA

PROCESS OF MAKING LAMINATED SHIMS

Application filed May 27, 1929. Serial No. 366,478.

My invention relates to improvements in making shims. As is well known in the art, shims are used to provide for taking up wear in bearings, to adjust the spacing of gears or housings, and in a variety of other applications. A shim usually comprises a plurality of thin laminæ held together or secured to a body plate in such a manner that the laminæ may be readily detached, one at a time, or, as desired, so as to reduce the thickness of the shim by a predetermined amount.

A more recent development in the art is the Babbitt-tipped shim for use with bearings provided with forced feed lubrication. The ordinary shim does not contact with the shaft in the bearings but is spaced slightly therefrom so as not to scrap the shaft. This spacing, however, leaves a channel through which oil may escape and in a pressure lubricating system it constitutes a serious leak which lowers the pressure of the system. The Babbitt-tipped shim overcomes this defect because it is provided, on its inner edge, with a lug or facing of babbitt or other bearing material which closes the channel above referred to, and maintains the pressure in the oiling system. In some cases, the channel is not entirely filled up by the lug, but is merely closed at each end by short lugs of bearing metal secured to the shim, leaving a pocket for oil between the lugs.

My invention has for an object to provide a new method of making shims both of the plain and Babbitt-tipped type.

Shim laminæ are made of very thin metal (usually brass) and the metal is comparatively expensive because of the labor involved in rolling it down to the requisite thinness and to accurate gage. Under ordinary conditions, it is not necessary to make the entire shim of thin laminæ, nor is it desirable to use the thin brass for this purpose without a substantial backing, because the metal is comparatively soft. It is customary, therefore, to make shims with a heavy body plate, or, in some cases, with several plates of substantial cross-section, and then to apply a limited number of thin laminæ to these plates, joining the whole by means of solder or other adhesive or cementing material.

Heretofore, it has been found necessary to use brass for the body plate of the shim. There are two reasons for this choice of metal: (1) The brass will not corrode when subjected to moisture: (2) It lends itself readily to soldering. With the object of reducing the cost of shims as much as possible, efforts have been made to use a less expensive metal for the body plate of the shim. A desirable metal for this purpose is steel or iron, steel being preferable because of its hardness, but the chief drawbacks to steel are the readiness with which it rusts and the difficulty with which it takes solder. When the laminæ are soldered to a steel body plate the latter must be treated with acid flux. This acid starts corrosion which gradually creeps over the entire surface of the plate. The corrosion acts not only to separate the laminæ from the plate, but also has a tendency to increase the thickness of the shim. For these reasons, a body plate of ferrous metal has heretofore been considered unsuitable for use in a shim.

However, I have found that a shim may be made economically with the use of steel or other ferrous metal or alloy, as the base plate, provided the steel is plated or coated with a material which will not only protect it against rust, but will also provide a good bond for the solder or other adhesive used. It is, therefore, an object of my invention to provide a shim in which a plurality of laminæ are secured to a base plate of ferrous metal provided with a protective coating. Various metals may be employed for plating the steel, such for instance as copper, nickel, etc. I have found that cadmium makes a particularly satisfactory coating material, because it maintains a good appearance and will not tarnish, because it protects the iron against rust, and because it provides an excellent bond for solder.

Another object of the invention is to provide a process of making a shim of this type in which the bearing edge of the shim is fitted with a facing of babbitt or other bearing material.

Other objects and advantages of my invention will appear in the following description of a preferred embodiment and thereafter the novelty and scope of the invention will be pointed out in the claims.

In the accompanying drawings:

Figure 1 is a view in perspective of my improved shim;

Fig. 2 is a view in cross section, the section being taken on the line 2—2 of Fig. 1;

Fig. 3 is a view in perspective of the body plate used in my shim, with a part of the Babbitt facing thereon; and Fig. 4 is a view in perspective of a number of laminæ ready to be applied to the body plate shown in Fig. 3.

The particular shim illustrated in the accompanying drawings is one in which the body plate is located in the middle of the shim with laminæ on opposite faces thereof. However, the particular form of the shim is immaterial and the shim can just as well be made of entirely different shape and with a different arrangement of parts, provided it has at least one body plate. In the drawings, the numeral 10 is used to indicate the body plate of a shim. This plate is provided with a central opening 11 to serve either as a bolt hole or an opening through which a centering stud may pass. The forward edge of the plate 10 is of undulatory form with orifices 13 passing through the plate within each undulation. The plate is stamped out of a steel sheet and hence the edges of the plate are rough at the edge. When steel is cut out by means of dies it is not severed smoothly, but breaks. The broken edge is granular and provides an excellent surface to which a plating will adhere. The orifices 13 will also have similar roughened surfaces with which the plating may knit very closely.

After the plate has been cut out and perforated, as shown, it is subjected to a plating treatment. The plating may be deposited mechanically or electrochemically according to the metal used. As explained above, I prefer to use cadmium although other plating metals can also be used. The cadmium plated body plate is proof against rust and owing to the broken surfaces above referred to there will be very close adherence between the cadmium and the steel along the edges of the plate and particularly in the orifices 13. Cadmium is known to provide a very good bonding surface for solder, babbitt, and other bearing metals.

The plate 10 is now placed in a suitable mold and a facing of babbit 14 is cast thereon. (In the use of the word "babbitt" I do not confine myself to the particular alloy originally known as Babbitt metal, but also mean to include other bearing alloys which are usually loosely termed Babbitt metals). The facing 14 is applied to the forward edge of the plate 10 and is also carried around the ends of the plate, as indicated at 15. The facing 14 not only fits over the edge of the plate 10 but also enters the perforations 13, and because of the affinity of cadmium for the babbitt, there is not only a mechanical union of the facing with the plate 10, due to the interlocking of the babbitt with the orifices 13, but there is also a metallurgical union so that the facing 14 is held very securely to the plate 10.

The facing 14 is made of a thickness equal to that of a finished shim; in other words, it stands above and below the plate 10 sufficiently to lie flush with the laminæ which are to be applied to the plate 10. The laminæ 16 are cut to the form shown in Fig. 4, with a central opening 17 adapted substantially to register with the opening 11, and with off sets 18 adapted to receive the end portions 15 of the Babbitt facing. A set of laminæ is applied to the upper face of the shim and another set to the lower face thereof, and then the laminæ are secured to the body plate by means of solder applied at each end, as indicated at 19, and also to the rear edge of the shim, as indicated at 20. This completes the manufacture of the shim.

It will be observed that the laminæ are not in any way secured directly to the facing 14 but are connected thereto indirectly by means of the solder 19 and 20 which attaches them to the body plate 10. Because the body plate is cadmium coated the soldering may be very readily effected and there will be very close adhesion between the laminæ and body plate. It will be understood, of course, that the soldering not only holds the laminæ to the plate 10, but also holds each lamina to the adjacent laminæ. The facing 14 may be cast upon the plate 10 after the laminæ 19 have been secured to the plate. I have found in practice that the babbitt or bearing metal, when thus cast on the plate, will not adhere to the edges of the laminæ.

While I have referred to the use of solder for connecting the shims, obviously other means could also be employed, such as lacquer, cement, or the like. Also, while I have referred specifically to the use of cadmium coating, my invention is not limited to the use of this material but is also applicable to other coating materials.

Having thus described my invention what I claim as new and desire to secure by Letters Patent is as follows:

1. The process of manufacturing a laminated shim which comprises the steps of providing a body plate of ferrous metal, coating said plate with a non-ferrous material, applying metallic laminæ to the plate and securing the laminæ to said plate.

2. The process of manufacturing a laminated shim which comprises the steps of providing a body plate of ferrous metal, coating said plate with a non-ferrous metal adapted to provide a good bond for solder, laying metallic laminæ on the body plate, and securing the laminæ thereto with solder.

3. The process of manufacturing a laminated shim which comprises the steps of providing a body plate of ferrous metal, coating said plate with a non-ferrous metal adapted to provide a good bond for solder, laying metallic laminæ on the body plate, and securing the laminæ to the plate and to each other with solder applied to the edges of the laminæ and the plate.

4. The process of manufacturing a laminated shim which comprises the steps of forming a body plate of steel with rough edges, coating said plate with a non-ferrous metal adapted to provide a good bond for solder, applying metallic laminæ to the plate, and securing the laminæ thereto with solder applied to the edges of the laminæ and the plate.

5. The process of manufacturing a laminated shim which comprises the steps of forming a body plate of steel with rough edges, plating said plate with cadmium, laying metallic laminæ upon the plate and securing the laminæ thereto with solder applied to the edges of the laminæ and the plate.

6. The process of manufacturing a laminated shim which comprises the steps of forming a body plate of ferrous metal, coating said plate with a non-ferrous metal adapted to provide a good bond for bearing metal, securing metallic laminæ on the plate, and casting a lug of bearing metal on one edge of the plate.

7. The process of manufacturing a laminated shim which comprises the steps of forming a body plate of steel, coating said plate with a metal adapted to provide a good bond for solder and bearing metal, casting a lug of bearing metal on one edge of the plate, laying metallic laminæ on the plate, and securing the laminæ to the plate with solder applied to the edges of the laminæ and the plate.

8. The process of manufacturing a laminated shim which comprises the steps of forming a body plate of steel with rough edges and with recesses at one edge thereof, coating the plate with a metal adapted to provide a good bond for solder and bearing metal, casting a lug of bearing metal on the recessed edge of the plate whereby the bearing metal will enter said recesses and also form a bond with the coating, laying metallic laminæ on the plate, and securing the laminæ to the plate with solder applied to the edges of the laminæ and the plate.

9. The process of manufacturing a laminated shim which comprises the steps of forming a body plate of steel with orifices therein adjacent one edge of the plate, the manner of said forming being such that the edges of the plate and the walls of the orifices will be rough, coating the plate with cadmium, casting a lug of bearing metal on the plate over the edge adjacent the orifices, whereby the lug will interlock with said orifices, laying metallic laminæ upon the plate and securing the laminæ to the plate with solder applied to the edges of the laminæ and the plate.

10. The process of making a laminated shim which comprises the steps of forming a body plate of steel with orifices therein adjacent one edge of the plate, the manner of said forming being such that the edges of the plate and the walls of the orifices will be rough, coating the plate with cadmium, laying metallic laminæ upon the plate, the laminæ being of such form as to cover the face of the plate except that portion which contains said orifices, securing the laminæ to the plate with solder applied to the edges of the laminæ and the plate, casting a lug of bearing metal on the exposed portion of the plate and into the orifices of such thickness that the top of the lug will lie flush with the top of the laminæ.

In testimony whereof, I have signed this specification.

LLOYD A. JOHNSON.